United States Patent
Su et al.

(10) Patent No.: US 6,789,164 B2
(45) Date of Patent: Sep. 7, 2004

(54) METHOD FOR DIRECTLY WRITING DATA INTO OPTIC DISK

(75) Inventors: Steel Su, Taipei (TW); Toon Jeow Foo, Singapore (SG)

(73) Assignee: Behavior Tech Computer Corporation, Taipei (TW)

(*) Notice: Subject to any disclaimer, the term of this patent is extended or adjusted under 35 U.S.C. 154(b) by 93 days.

(21) Appl. No.: 10/096,933

(22) Filed: Mar. 14, 2002

(65) Prior Publication Data

US 2003/0177304 A1 Sep. 18, 2003

(51) Int. Cl.[7] ............................................. G06F 12/00
(52) U.S. Cl. ..................... 711/112; 711/115; 711/165; 365/51; 365/52
(58) Field of Search .............................. 711/112, 115, 711/165; 365/51, 52

(56) References Cited

U.S. PATENT DOCUMENTS

| 5,815,426 A | * | 9/1998 | Jigour et al. .................. 365/51 |
| 6,264,506 B1 | * | 7/2001 | Yasufuku et al. ............. 439/638 |
| 6,304,920 B1 | * | 10/2001 | Kobayashi et al. ............. 710/1 |
| 6,438,638 B1 | * | 8/2002 | Jones et al. .................. 710/301 |
| 6,591,363 B1 | * | 7/2003 | von Below .................... 713/2 |

* cited by examiner

Primary Examiner—Mano Padmanabhan
Assistant Examiner—Mehdi Namazi
(74) Attorney, Agent, or Firm—Rosenberg, Klein & Lee

(57) ABSTRACT

A method for directly writing data into an optic disk is performed by an optic disk drive incorporating a control unit to which an external data storage device, such as compact flash memory device, is connected. The method includes steps of (1) initiating a writing operation, (2) setting the optic disk drive to busy condition, (3) checking if an optic disk is properly loaded and if the external memory device is correctly connected, (4) issuing a warning, if they are not properly loaded or connected, (5) checking if the optic disk is a UDF disk, (6) issuing a warning, if it is not, (7) creating a folder in the optic disk, (8) retrieving data from the external data storage device and writing the data into the folder of the optic disk, and (9) ending the writing operation. No computer-based interface is required between the optic disk drive and the external data storage device in performing the data writing operation.

4 Claims, 2 Drawing Sheets

METHOD FOR DIRECTLY WRITING DATA INTO OPTIC DISK

BACKGROUND OF THE INVENTION

1. Field of the Invention

The present invention generally relates to a method for directly writing data into an optic disk without a computer system; and in particular to a method for directly writing data retrieved from an electronic data storage into an optic disk without a computer system interfacing therebetween.

2. The Related Art

With the rapid development and prevalence of electronic storages, such as compact flash memory, more and more data are stored in the electronic storage for portability and fast access. To more space-efficiently store the data, some people prefer to transfer the data from the electronic storage to optic disks for data backup purposes. Heretofore, the optic disk drive must be connected to a computer system for data writing operation. Thus, the data have to be read into the computer system and then written by the computer system into the optic disk accessed by means of the optic disk drive. This causes problems. For example, a computer system is a must in transferring data from a portable compact flash memory device to an optic disk. Thus, such a data transfer operation cannot be carried out without a computer system having proper data ports.

Thus, the present invention is aimed to solve the above problem by providing a method for directly transferring data from a compact flash memory device to an optic disk without a computer system interfacing therebetween.

SUMMARY OF THE INVENTION

Accordingly, an object of the present invention is to provide a method for writing data retrieved from an electronic storage to an optic disk without a computer system interfacing therebetween.

Another object of the present invention is to provide an optic disk drive capable to perform a direct writing operation to an optic disk without being controlled by a computer system.

To achieve the above objects, in accordance with the present invention, there is provided a method for directly writing data into an optic disk that is performed by an optic disk drive incorporating a control unit to which an external data storage device, such as compact flash memory device, is connected. The method comprises steps of (1) initiating a writing operation, (2) setting the optic disk drive to busy condition, (3) checking if an optic disk is properly loaded and if the external memory device is correctly connected, (4) checking if the optic disk is a UDF disk; (5) issuing a warning, if it is not, (6) creating a folder in the optic disk, (7) retrieving data from the external data storage device and writing the data into the folder of the optic disk, and (8) ending the writing operation. No computer-based interface is required between the optic disk drive and the external data storage device in performing the data writing operation.

BRIEF DESCRIPTION OF THE DRAWINGS

The present invention will be apparent to those skilled in the art by reading the following description of a best mode of the operation thereof, with reference to the attached drawings, in which.

BEST MODE FOR CARRYING OUT THE PRESENT INVENTION

Figure 1:
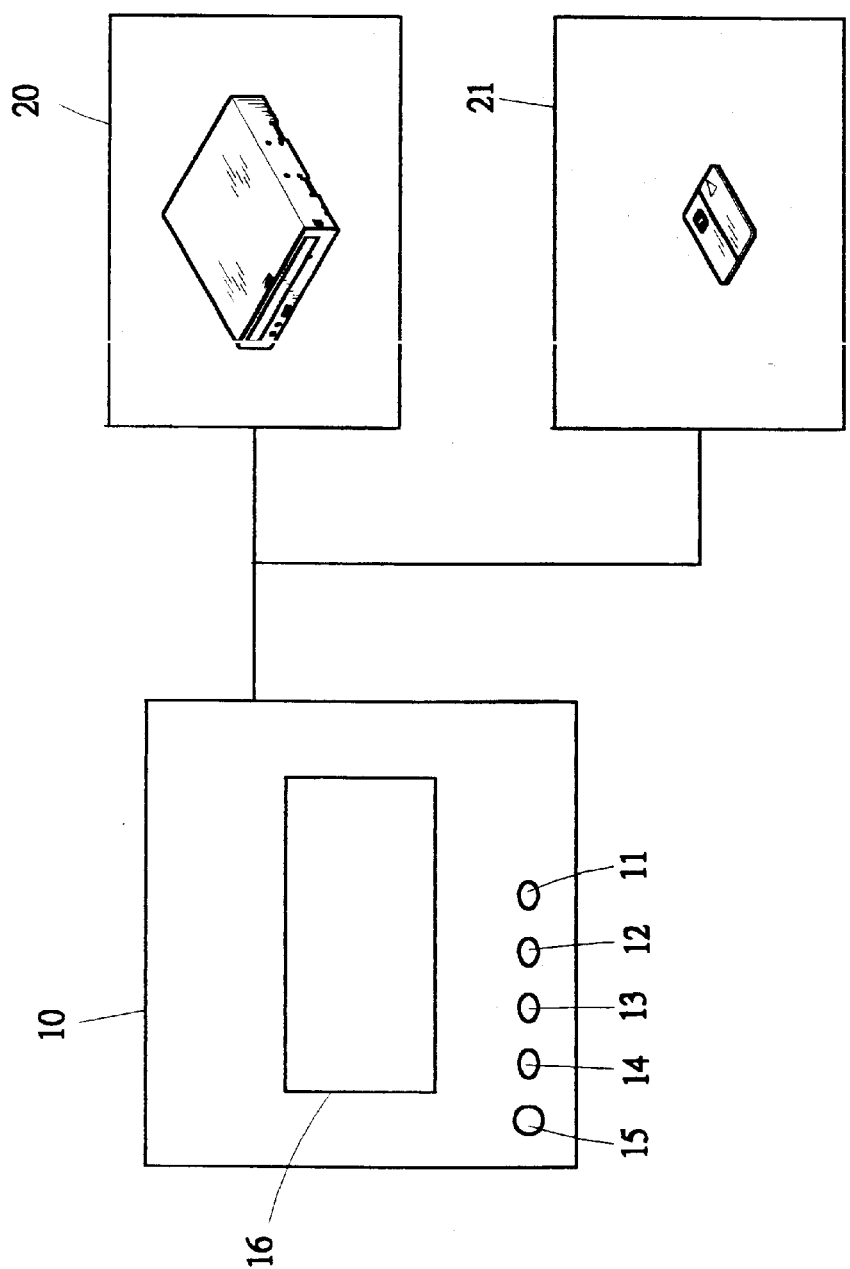
FIG. 1 is a schematic view of a system for performing a method of directly writing data into an optic disk in accordance with the present invention.

With reference to the drawings and in particular to FIG. 1, a method for directly writing data into an optic disk in accordance with the present invention is used in a rewritable optic disk drive 20 for retrieving data from an electronic storage, such as a compact flash memory device 21, and directly writing data into an optic disk loaded in the optic disk drive 20 without a computer system interfacing between the optic disk drive 20 and the compact flash memory device 21.

The method is preferably embodied in software form loaded in a control chip 16. The control chip 16 is arranged in a control unit 10. A number of operation keys, including a starting key 11, a writing key 12, a selection key 13 and a formatting key 14, and an operation indicator 15 are formed on the control unit 10 for user's control of the operation of the control unit 10. The starting key 11 is to power on the control unit 10 or to start the operation of the control unit 10. The writing key 12 is to start a writing operation of the optic disk drive 20 under the control of the control unit 10. The selection key 13 is to select among different writing modes. The formatting key 14 is to start a formatting operation of the optic disk by the optic disk drive 20. The indicator 15 indicates ending of the writing operation or the formatting operation.

Figure 2:
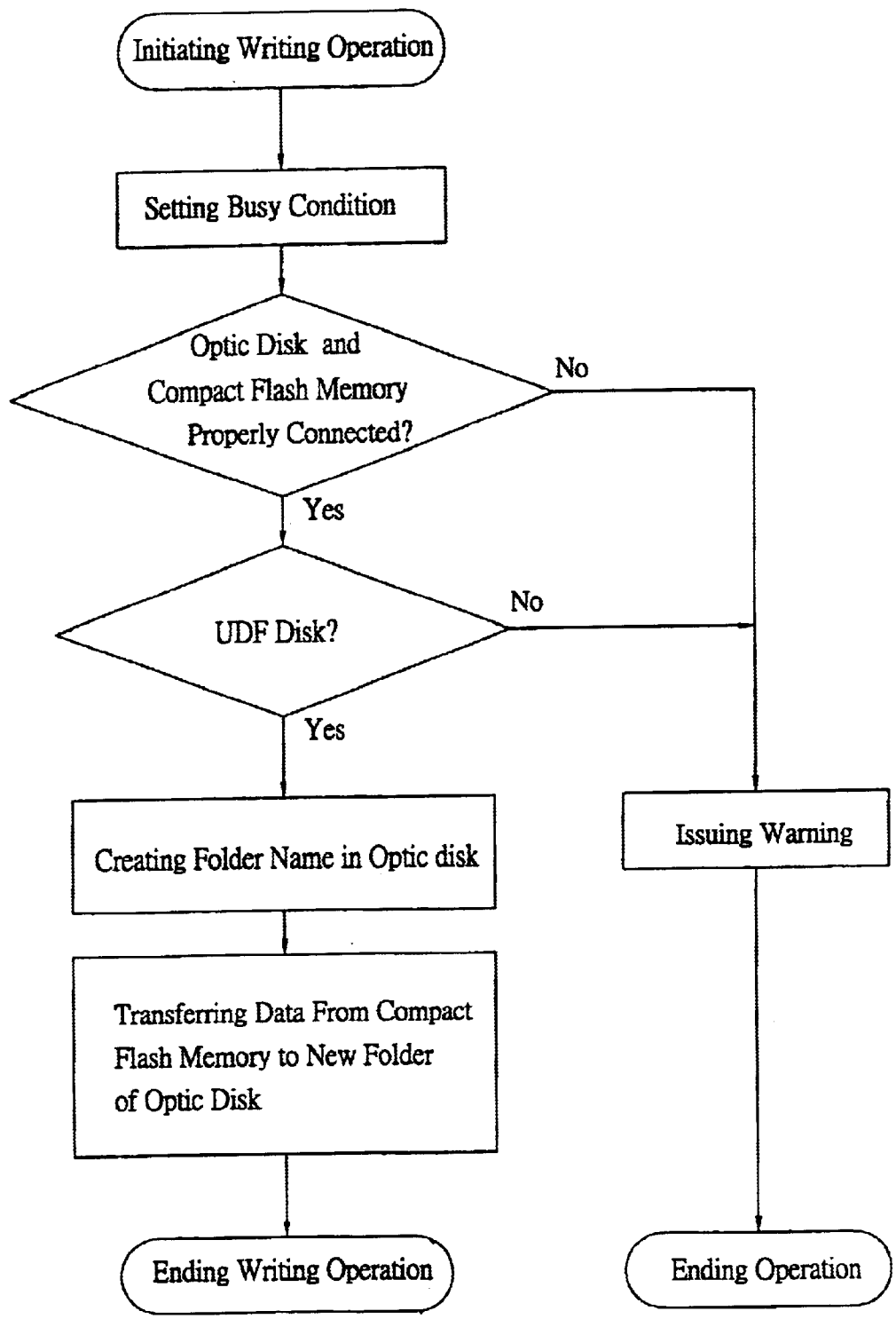
FIG. 2 is a flow chart of the method for directly writing data into an optic disk in accordance with the present invention.

Also referring to FIG. 2, the operation of directly writing data into an optic disk in accordance with the present invention is as follows:

(1) Actuating the starting key 11 to start the operation of the control unit 10;

(2) Setting the optic disk drive 20 to busy condition;

(3) Checking if an optic disk and a compact flash memory device are correctly loaded/connected. If they are not correctly connected, then issuing a warning;

(4) Checking if the optic disk is a UDF (Universal Disk Format) disk if the optic disk and the compact flash memory device are correctly connected. If the optic disk is not a UDF disk, then issuing a warning;

(5) Creating a new folder in a real time manner in the optic disk;

(6) Retrieving data from the compact flash memory device and writing the data into the new folder of the optic disk;

(7) Ending the writing operation;

(8) If no correcting operation is taken in step (3) or (4) to fix the warnings, then ending the operation of the control unit 10 with no data being written into the optic disk.

In accordance with the present invention, the above-discussed writing operation can be initiated by the actuation of the writing key 12. Alternatively, the control unit 10 can be designed to start the writing operation by the actuation of the start key 11. In this respect, the start key 11 starts the operation of the control unit 11 as well as initiates the writing operation. For a non-formatted disk, the formatting and writing operations can be done separately by means of the formatting key 14 and the writing key 12.

To this point, it can be observed that the electronic storage 21 is connected to the optic disk drive 20 by the control unit 10. For example, the electronic storage 21 can be connected to a standard communication port, such as a USB (Universal Serial Bus) port, formed on the control unit 10. The writing operation is initiated by the actuation of the keys of the control unit 10. Thus, a computer system is no longer needed in transferring data from the electronic storage 21 to the optic disk.

The control unit 10 can be combined with an optic disk drive. For example, the control chip 16 is integrated with the optic disk drive and the keys formed on a casing of the optic disk drive. This simplifies the operation. Thus, a compact flash memory device can be connected to an optic disk drive via for example a USB port. Data stored in the compact flash memory device can thus be transferred into an optic disk loaded in the optic disk drive without a computer system interfacing between the compact flash memory device and the optic disk drive.

Although the present invention has been described with reference to the best mode thereof it is apparent to those skilled in the art that a variety of modifications and changes may be made without departing from the scope of the present invention which is intended to be defined by the appended claims.

What is claimed is:

1. A method for directly writing data into an optic disk via an optic disk drive, comprising the steps of:
    (a) forming a stand alone system including an optic disk drive, a data storage device and a control unit coupled directly between said optic disk device and said data storage device, said control unit including operation keys exposed thereon for a user's interfacing therewith for controlling the operation of said stand alone system through said control unit, said operation keys including a starting key, a writing key, a selection key, a formatting key and an operation indicator;
    (b) initiating a writing operation by actuating said starting key or said writing key on said control unit by the user;
    (c) setting the optic disk drive to a busy condition;
    (d) selecting a specific writing mode by actuating said selection key on said control unit by the user;
    (e) checking if the optic disk is correctly loaded in the optic disk drive and if the external data storage is connected to the control unit;
    (f) if the optic disk is not correctly loaded or if the external storage is not connected to the control unit, issuing a warning;
    (g) checking if the optic disk is an UDF disk;
    (h) if the optic disk is not an UDF disk, issuing a warning;
    (i) creating a fold folder in the optic disk in real time manner;
    (j) retrieving data from the external data storage and writing the data into said folder of the optic disk; and
    (k) ending the writing operation, said operation indicator on said control unit indicating the ending of the writing operation.

2. The method as claimed in claim 1 further comprising a step of ending the operation if the warning issued in step (F) is not properly corrected.

3. The method as claimed in claim 2 further comprising a step of ending the writing operation if the warning issued in step (H) is not properly corrected.

4. The method of claim 1, further comprising the step of actuating said formatting key on said control unit to initiate formatting of the optic disk.

* * * * *